United States Patent [19]
Bekhiet

[11] Patent Number: 4,981,438
[45] Date of Patent: Jan. 1, 1991

[54] UNIVERSAL INTERCONNECTION SYSTEM HAVING INTERCHANGEABLE CIRCUIT BOARDS

[76] Inventor: Fauzi Bekhiet, Eichhölzelstr. 7-9, D-6923, Waibstadt, Fed. Rep. of Germany

[21] Appl. No.: 361,754

[22] Filed: Jun. 2, 1989

Related U.S. Application Data

[63] Continuation of Ser. No. 102,629, Sep. 30, 1987, abandoned.

[30] Foreign Application Priority Data

Sep. 30, 1986 [DE] Fed. Rep. of Germany ....... 3633218

[51] Int. Cl.$^5$ .......................... H01R 25/00; H05K 1/00
[52] U.S. Cl. ....................................... 439/76; 439/502; 439/638
[58] Field of Search .................... 439/59–62, 439/76, 607–610, 110–120, 207–216, 535, 638–655, 502–506; 361/393, 394, 399, 412, 413, 415; 312/223; 379/325–331, 397

[56] References Cited

U.S. PATENT DOCUMENTS

| | | | |
|---|---|---|---|
| 1,779,924 | 10/1930 | Wallace | 439/535 |
| 3,521,220 | 7/1970 | Clarke, Jr. et al. | 439/447 |
| 3,524,198 | 8/1970 | Malmstadt et al. | 361/394 |
| 3,541,396 | 11/1970 | Cardwell et al. | 361/412 |
| 3,648,115 | 3/1972 | Teagno | 361/413 |
| 3,654,586 | 4/1972 | Winkler . | |
| 3,668,476 | 6/1972 | Wrabel et al. | 361/413 |
| 3,950,058 | 4/1976 | Cronin | 439/51 |
| 4,146,287 | 3/1979 | Jonsson . | |
| 4,280,062 | 7/1981 | Miller | 307/10 L S |
| 4,362,905 | 12/1982 | Ismail | 439/653 |
| 4,440,463 | 4/1984 | Gliha, Jr. et al. | 439/92 |
| 4,498,716 | 2/1985 | Ward | 439/55 |
| 4,514,028 | 4/1985 | Kuo | 439/488 |
| 4,531,176 | 7/1985 | Beecher, II | 361/399 |
| 4,544,227 | 10/1985 | Hirose | 439/607 |
| 4,577,917 | 3/1986 | Nashimoto et al. | 439/736 |
| 4,688,864 | 8/1987 | Sorel | 361/394 |
| 4,760,375 | 7/1988 | Stecker | 439/76 |
| 4,838,175 | 6/1989 | Hauville | 312/223 |

FOREIGN PATENT DOCUMENTS

| | | |
|---|---|---|
| 1957847 | 5/1971 | Fed. Rep. of Germany . |
| 2640233 | 3/1978 | Fed. Rep. of Germany . |
| 2943787 | 5/1981 | Fed. Rep. of Germany . |
| 3133810 | 3/1983 | Fed. Rep. of Germany . |
| 576709 | 6/1976 | Switzerland . |
| 2139017 | 10/1984 | United Kingdom . |

OTHER PUBLICATIONS

German Catalog "RIM Electronic 83", Munich 1983, pp. 698–703.

*Primary Examiner*—Neil Abrams
*Attorney, Agent, or Firm*—Wood, Phillips, Mason, Recktenwald & VanSanten

[57] ABSTRACT

A system for interconnecting the connectors of two or more electrical appliances, each preferably having two or more terminals, wherein the connectors and terminals may be of different physical configurations. The system includes one conductor for connection to each terminal of each appliance, a connector at one end of each conductor to mate with one of the terminals, a coupler connector at a second end of each conductor, and an interface module interconnecting the coupler connectors. The interface module comprises a connector enclosure in which interchangeable transfer circuit boards are carried. By replacing circuit boards, numerous types of different electrical interconnections can be made using only a few types of interconnect cables.

47 Claims, 12 Drawing Sheets

FIG.3
FIG.4
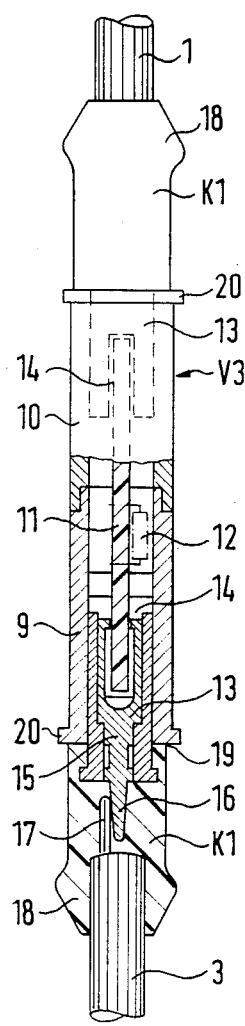
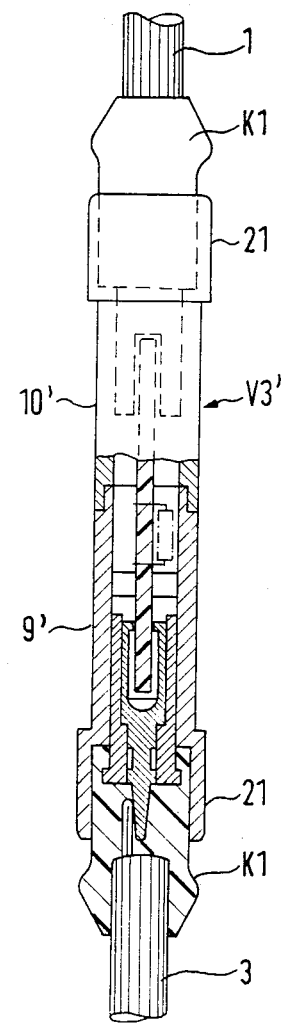

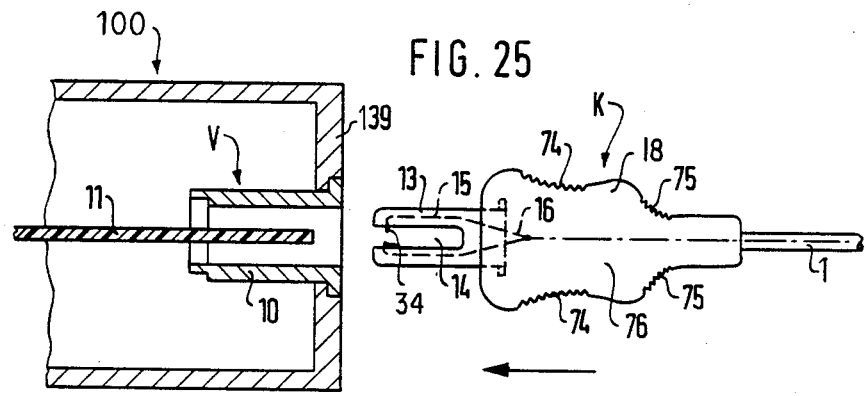
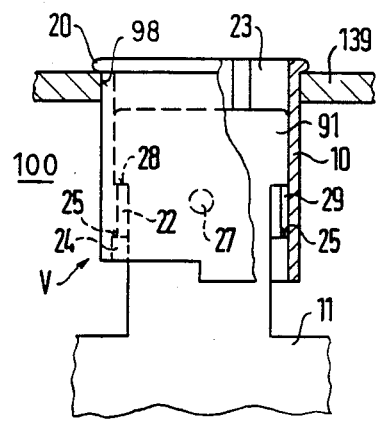
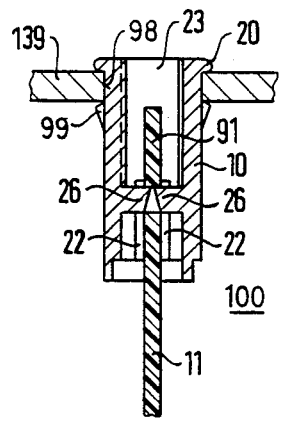
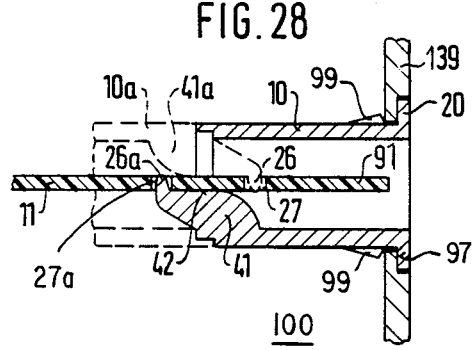

UNIVERSAL INTERCONNECTION SYSTEM HAVING INTERCHANGEABLE CIRCUIT BOARDS

This is a continuation of application Ser. No. 102,629, filed Sept. 30, 1987, now abandoned.

TECHNICAL FIELD OF THE INVENTION

The invention relates to a system of connecting devices for interconnecting electrical devices or appliances using cables having leads fitted with plug-in connectors.

BACKGROUND OF THE INVENTION

Different types of electrical appliances, such as radio and stereo units, are usually interconnected by means of power cords or connecting cables, each fitted at the ends with a connecting component or components, such as plug-type connectors which are individually assigned to the electrical appliances concerned. Such connectors vary considerably from appliance to appliance, especially between older and newer appliances. This makes it difficult, especially in the case of multiple-way plug connections, to assign individual connecting cables or leads to the different connectors used with different electrical appliances (especially newly-introduced appliances) and to provide them with suitable types of interconnections Lack of functional clarity in this respect often leads to faulty coupling and connections.

Various standard plug-type connectors have been developed worldwide over the years, like the DIN standard multipole plug, the jack plug, the loudspeaker plug, the cynch plug, among others. For the interconnecting of electrical appliances fitted with these types of plugs or connector sockets, the appropriate interconnecting cables with corresponding terminals are required. This presents no problem so long as the appliances are fitted with the same standard connectors. In practice, however, this can never be guaranteed. But if the electrical appliances to be interconnected are equipped with different types of connectors, the interconnecting cables have previously been required to be fitted with connectors having terminals corresponding with those of the respective types being used. This has led to a bewildering profusion of differently-fitted interconnecting cables. Suppliers of these interconnecting cables must invest a considerable amount if they are to meet all consumer requirements. Moreover, extensive warehousing is necessary. Furthermore, batch quantities of particular types of cables are comparatively low, so that these interconnecting cables are correspondingly expensive. Apart from this, it is no easy matter for the individual consumer to obtain the appropriate interconnecting cables, since he has to acquaint himself with the wide variety of different models in use.

Accordingly, a primary object of the present invention is to provide a universal interconnection system wherein functional clarity in regard to the layout of connectors and terminals is achieved with the use of a small number of different types of cables suitable for numerous electrical appliances, and wherein the required components are of simple design and are easy to manufacture and assemble.

SUMMARY OF THE INVENTION

The present invention provides a universal interconnection system for interconnecting the electrical connectors of various types of electrical appliances using cables having leads fitted with plug-type connectors, where each connector preferably comprises a minimum of two terminals. These cables are electrically interconnected by an interface module or housing having interchangeable transfer circuit boards, which mate with corresponding connectors on the cable leads, these leads being fitted with connectors for connection with the electrical appliances. The interface module comprises a connector enclosure in which a contact plate, made of insulating material, is fitted. The contact plate carries transfer circuits in the form of printed conductors that serve as terminals for the connectors of the interconnection leads in the manner of a contact blade.

The present system of interconnection has the advantage that for every output or input on an electrical appliance, which from its shape calls for a specific plug or connector, only one type of interconnection cable is needed. The correct electrical connection is provided by the connector alone. Accordingly, it is possible for numerous types of different electrical interconnections to be made with the use of only a few types of interconnection cables. With the use of the interconnecting system of the present invention, the functional clarity of the terminals and interconnection layout is appreciably enhanced in comparison with conventional interconnection systems, and the particular circuit arrangement can easily be altered by the user. If a customer acquires a new appliance, for example, which has the same kind of connection cables as his old appliance but requires a different electronic circuit, all he has to do is to buy a new transfer circuit board. Supplier warehousing is also simplified, since the number of interconnection cables with different connectors at each end that need to be stored is greatly reduced. The specific way in which the interface module is designed makes for a cable interconnection system that is easy to manufacture and can readily be given particular designations—especially with the use of a transfer circuit in the form of a printed circuit board that can be located in the module enclosure, so that the interconnections to be made are shown far more clearly.

Preferably, the interface modules should have at least two plug-type receptacles, one on each side of the housing, for example. A provision can also be made for the system to be provided with more than one interface module, in particular if the interconnection cable has two or more connectors for plugging into receptacles of different interface modules.

There is a wide field of application for this system, especially for linking audio and video equipment. But there are a large number of other electronic devices where it is also required to interconnect a far greater number of connectors belonging to different appliances. This is particularly true in the case of data processing equipment. There is also a requirement with this type of equipment for interconnecting devices that are designed to be more user-friendly, because they are simpler to manufacture, call for less storage space, and go beyond standard models in their construction. Particularly where data processing equipment (terminal units) made by different manufacturers are linked, there are in-house specifications, especially with signal coding, that are not compatible as a general rule.

This compatibility problem can be overcome in suitable embodiments of the present invention.

The interface module enclosure generally has plug-type receptacles of a single type. Thus, system interconnection can be made by means of suitable connection leads to the circuit enclosure of any appliance. The interface module encloses the transfer circuit contact plate, which interconnects both ends of the module enclosure via the plug-type receptacles and so enables electrical contact. Through being positioned in the enclosure, the contact plate can be so designed that it can carry a large number of circuits. It can also carry switching and/or indicator components. In this way, the user can, without having to alter the connections between the different electrical appliances, switch over from one application to another. These applications can be indicated on the transfer circuit boards themselves. Other functions can also be indicated.

Furthermore, electrical appliances made by different manufacturers, however varied, can be linked together, as appropriate interface connections and, if required, signal code decoding circuits for different systems, can be accommodated on a contact plate in a single transfer circuit enclosure. All that is required is that the interconnection cables are correctly connected. Through the provision of guide and/or keying grooves and fins, faulty connections can be avoided. Almost any particular form of circuit configuration can also be adopted. This has the advantage for the user that, if he wants to replace one of his appliances by another made by a different manufacturer, he does not have to acquire a new transfer circuit board, but merely a new interconnection cable suitable for the new appliance, which he then has to connect to the interface module by means of a suitable plug-tyoe connector.

In some circumstances, several interface modules could be provided, still using the same basic idea for the construction of an interconnection system. This circumstance will arise if interfacing circuits and/or signal decoding circuits entail a considerable outlay, so that, on grounds of cost (and of space), it is advisable not to provide all the available electrical configurations within a single transfer circuit enclosure. But the universal interconnect cable principle can still be applied in the linking of separate circuit enclosures. Such connections can be achieved through the provision of electrical connection via a contact plate directly linking together two interface modules, whereby the contact plate can be plugged into a fixed coupler layout in one at least of the circuit enclosures, the other ends of which are electrically connected to the installed contact plate, and where appropriate, soldered onto it. This can be the case with both interface modules.

Furthermore, the interconnection system of the present invention can be constructed in such a way that an external plug-in module is connected between two interface modules required to be interconnected. The two interface modules may be fitted with connectors at both ends which are themselves interconnected in such a manner that they will not bend. Electrical and/or electronic components can also be provided inside the rigid part of the plug-in module. This will enable further programming and coding. Such programming can also be undertaken with the use of plug-in modules that can be plugged in at only one interface module, and contain the necessary electric and/or electronic components. In this way the interface modules can be made so as to be stackable horizontally and/or vertically. Additionally, with the use of an appropriate plug-in module, external programming can be undertaken at a single interface module, whereby security against faulty connections is provided by an appropriate form of covering for the plug-in connections.

The proposed construction of the interconnection system components in accordance with a particular application using at least one circuit designation panel, enables the user to recognize quickly which connector to use for the application he has in mind, and with which interface modules it is connected. In particular, using both features (the designated interface module circuit enclosure on one hand and the designation panel on the other) makes it possible to provide an exceptionally user-friendly and economical system for the interconnection of electrical appliances.

It can also be advantageous to provide the interface module enclosure and/or the cable connector with electrical shielding. Furthermore, it is particularly advantageous to introduce a form of keying for the noninterchangeable assembly of interconnection cables and modules.

Additional ways in which the invention can be developed to advantage are illustrated in the accompanying drawings and set forth in the following descriptions of preferred embodiments.

BRIEF DESCRIPTION OF THE DRAWINGS

FIG. 3 represents a portion of a first type of interconnecting cable seen in partial cross-section.

FIG. 4 illustrates a portion of a second type of interconnecting cable also seen in partial cross-section.

FIG. 25 illustrates in partial cross-section the interconnection system of FIG. 24, with the cable connector not plugged in.

FIGS. 26 and 27 illustrate details of the interface module enclosure of FIG. 24 in various views.

FIG. 28 shows another type of mechanical connection between an interface module enclosure and a contact plate.

DETAILED DESCRIPTION OF THE PREFERRED EMBODIMENTS

Figure 1:
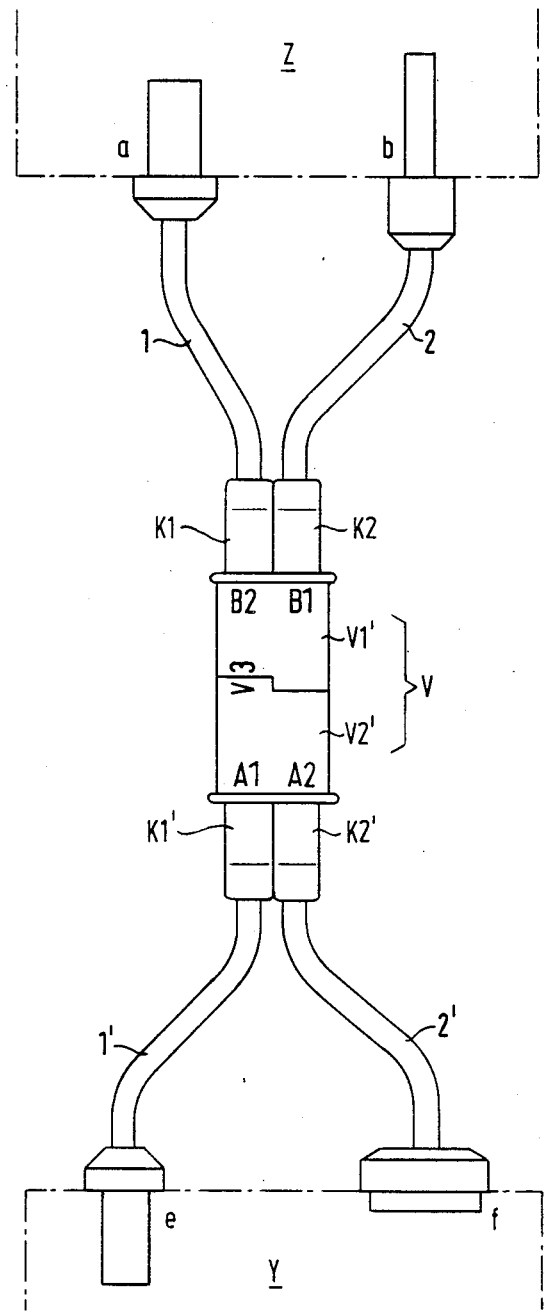
FIG. 1 illustrates two different electrical appliances electrically interconnected by means of interconnecting cables in accordance with the present invention.

FIG. 1 illustrates the basic principle of the universal interconnection system of the present invention. It shows in diagram form two electrical appliances Y and Z each with different types of electrical connectors a,b and e,f which are required to be electrically connected together. In accordance with the invention, connection cables or leads 1, 2, 1', 2', each having one or more conductors, are fitted with connectors at one end corresponding with the specifications for both electrical appliance Y and Z, and can therefore be plugged into the mating terminals of connectors a,b or e,f. The other ends of the connection cables 1, 2, 1', 2' are fitted with coupler connectors K1, K2, K1' and K2', designed as individual plug-in connectors. The electrical contact for the mutually functional connection leads 1 and 1' and 2 and 2' is supplied by an interface module V3 consisting of two sections, V1' and V2', into which the coupler connectors K1 and K2 on the one hand and K1' and K2' on the other can respectively be plugged. As explained further later on, the interface module V3 contains a contact plate, housed in both interface module sections V1' and V2', the two interface module sections being locked together to form a single component unit. The contact plate comprises printed circuit lines which connect together the contacts or terminals of the coupler connectors. As also described further below, the coupler connectors can have the same number or a different number of contacts, and the interface module can be adapted to accommodate one or more coupler connectors. Three contacts would appear to be a suitable number, so that the interface module is purposely given a contact plate that has three printed lines or a whole number multiple thereof, and is of correspondingly spacious construction. In the embodiment illustrated in FIG. 1, using the assumption that both coupler connectors K1 and K2 each has three contacts, the interface module would have six printed lines.

A different number of contacts can of course be provided in accordance with other requirements. In certain cases, a coupler connector can be provided with only one contact (with test purposes in mind, for example). It can now be seen that the quantity of connecting cables that need to be held in storage is appreciably reduced, since connection leads only need to be held in a number corresponding with the number of different type specifications. Stocks of interface modules V will also need to be held.

Figure 2:
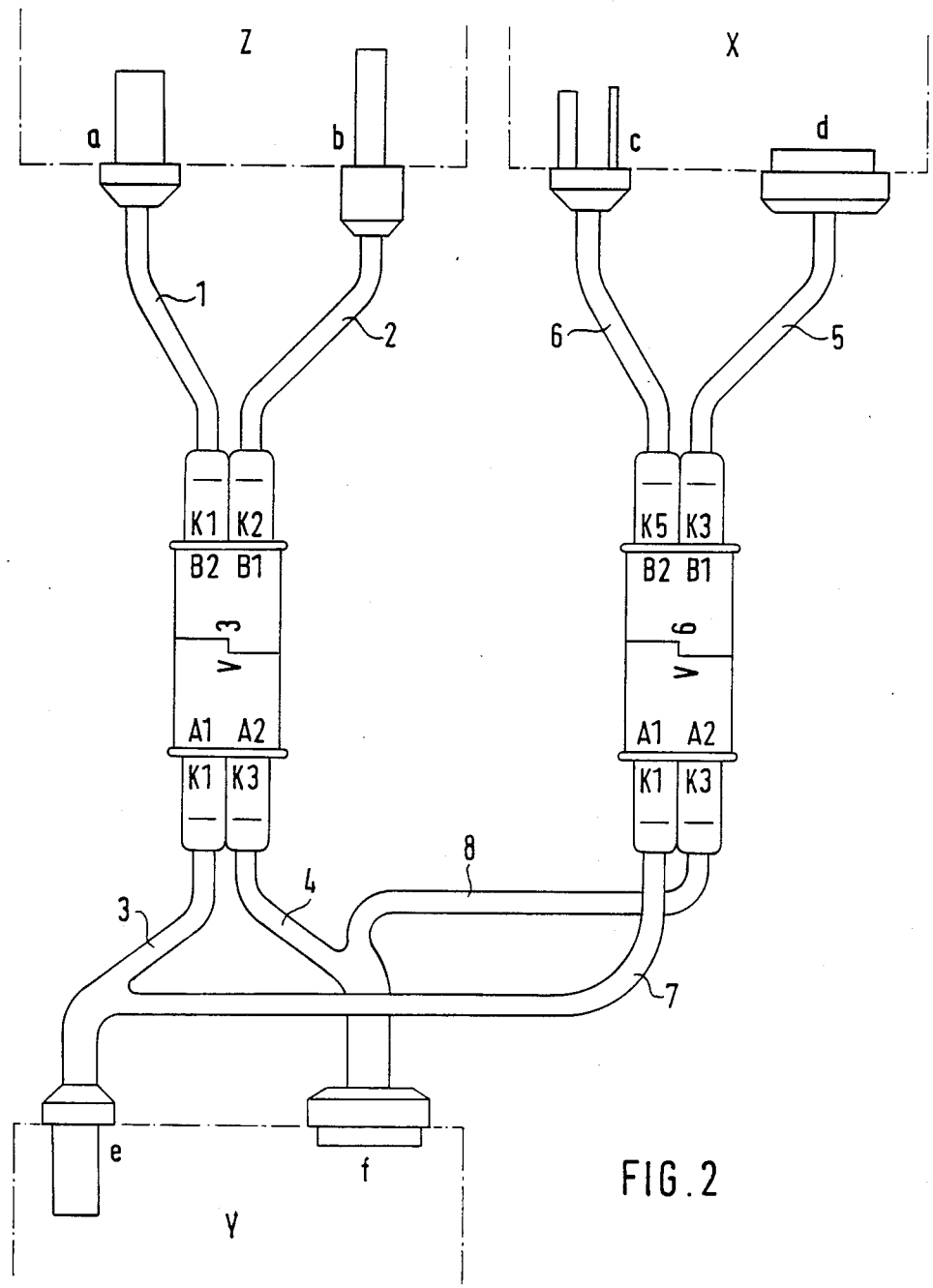
FIG. 2 illustrates three different electrical appliances electrically interconnected by means of interconnecting cables in accordance with the present invention.

In the embodiment represented by FIG. 2, the plug-in connectors e and f of electrical appliance Y are required to be electrically connected with the plug-in connectors a,b, c and d of two electrical appliances X and Z. Here the connection leads 1, 2, 3, 4, 5, and 6 are used, with further leads 7 and 8 branching off from leads 3 and 4, respectively. Electrical linkage between the electrical appliances Y and Z is identical with the connection layout shown in FIG. 1. Another interface module V6 provides for electrical connection between appliances X and Y, in addition to interface module V3, with plug-in receptacles A1, A2, B1, and B2, into which once again coupler connectors K1, K3 and K5 can be plugged. Coupler connectors K3 and K5 are in turn linked with connection leads 5 and 6, which can be plugged into the plug-in in receptacles c and d of appliance X. The electrical appliances determine the respective type of leads required in terms of the type of plug-in connectors or receptacles at the inputs and outputs which need to be fitted with the corresponding plug-in connectors and coupler connectors respectively. The correct electrical or electronic connection with any other electrical appliance is determined by the interface module.

Figure 18:
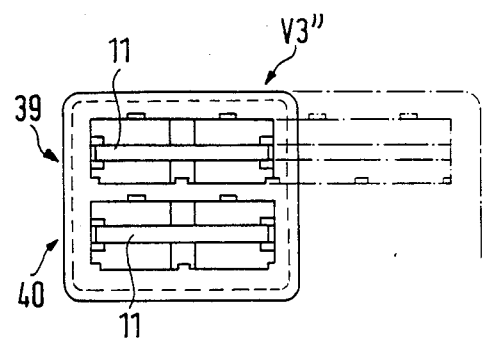
FIG. 18 illustrates the front view of a different embodiment of an interface module.

In the foregoing embodiments, the interface modules V3 and V6 each have two plug-in receptacles o either side to provide a plug-in facility for two coupler connectors. There is, of course, no restriction on the number of plug-in receptacles (placed side-by-side or superposed) that the interface module may have, as shown in FIG. 18. In the succeeding embodiments a connector V, V3 for example, has two plug-in receptacles on both sides in each case.

FIG. 3 shows specific details of the interface module V3 together with coupler connectors K1. The interface module V3 consists of two enclosure sections 9 and 10, that can be assembled to form a closed housing enclosing a contact plate 11 in the form of a printed circuit board. Contact plate 11 is made of insulating material, and preferably comprises a plurality of rectilinear, parallel, strip-like metal plating printed lines corresponding to the number of coupler connectors and their contacts. Electrical connection is provided by these printed lines from one side to the other of interface module V3. Various electrical components 12 can be accommodated on the contact plate for electronic control of the electrical connection, and may be linked to the printed lines.

The coupler connectors K1 can be mounted on either side of the interface module. Each coupler connector K1 comprises a coupler enclosure 13, with a continuous plug-in slot at the front, with one or more contact terminals 15 for each electrical connection, e.g. three, preferably fabricated by the stamping method. Each contact terminal is shaped like a fork on the contact side and on the other side has a soldered lug 16 to provide a solder connection with the cores 17 of the appropriate connection leads 1, 3. As is explained in greater detail later, the fork-shaped parts of the contact terminals are positioned on either side of plug-in slot 14 inside the coupler enclosure 13. The soldered joint and part of the end of the cable are covered with an insulation cover 18. Coupling is effected by the two opposite ends of the contact plate 11 serving as a contact blade, on which the slotted coupler connectors K1 can be mounted, with the contact terminal 15 coming into electrical contact with the printed lines of contact plate 11. In this embodiment, the end flanges 19 of the insulating cover 18 are flush with the stop shroud 20 of interface module sections 9 and 10.

The only difference in the embodiment illustrated in FIG. 4 as opposed to that illustrated in FIG. 3 is that enclosure sections 9' and 10' of interface module V3' are fitted with plug-in sleeves 21 in one piece, into which the respective coupler connectors K1 can be plugged. These extended plug-in sleeves 21 afford improved locking of coupler connectors K1 and improved electrical shielding for the contacting or soldering area, especially if, as explained below, the whole connector is provided with electrical shielding.

Figure 5:
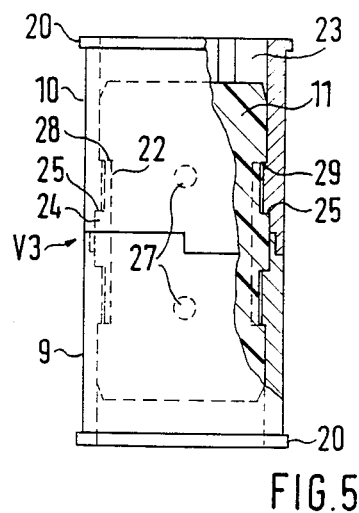
FIGS. 5 and 6 illustrate an interface module in detail as shown in two different cross-sectional views.
Figure 6:
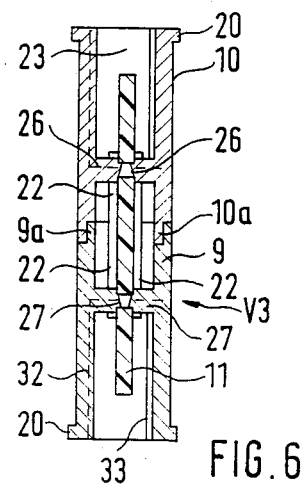

FIGS. 5 to 10 show the interface module V3 in detail. Its two enclosure sections 9 and 10 have their front faces turned towards one another. For example, lockable or form-close compatible connecting sections can be assembled together—10a, 10a', 10b and 10b'—and corresponding connecting sections engage when enclosure section 9 and 10 are assembled together. As is shown in FIGS. 6 and 7a, enclosure sections 9 and 10 are of identical construction.

Figure 7:
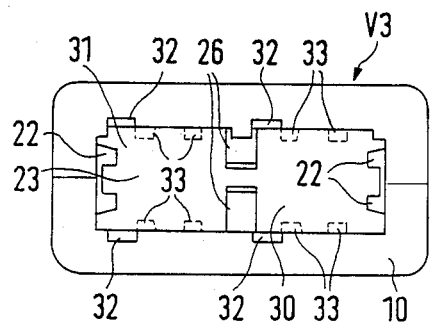
FIGS. 7 to 10 illustrate different keying schemes at the receptacle in accordance with FIGS. 5 and 6.
Figure 7A:
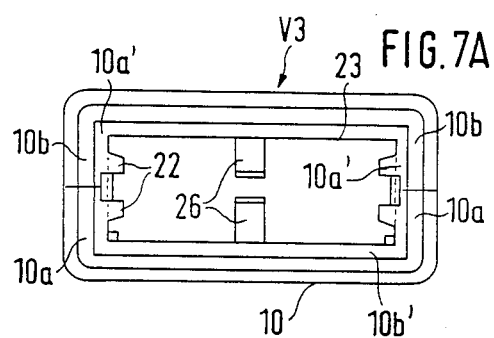
Figure 11:
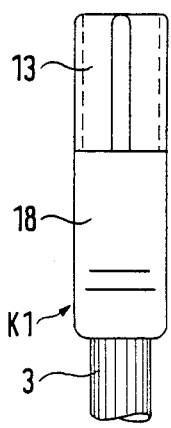
FIGS. 11 and 12 represent the details of a cable connector in two different views.
Figure 12:
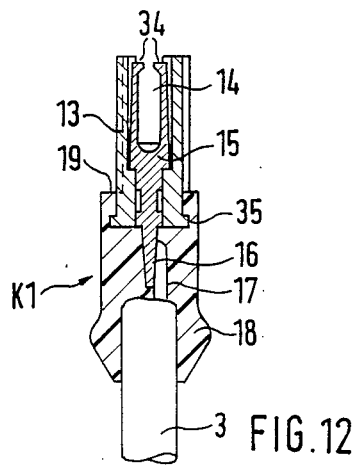
Figure 13:
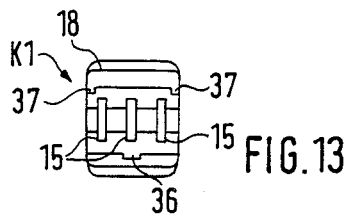
FIGS. 13 to 16 illustrate the cable connector of FIGS. 11 and 12 with different keying schemes.

As seen in FIG. 7a, enclosure section 10 has an outer raised connecting lower section 10a, U-shaped, around one-half of the area of the enclosure, and a similar inner raised U-shaped connecting upper section 10a' in the other half of the enclosure, which is offset inwards by the width of the connecting section. In continuation of the outer connecting lower section 10a is an outer groove-like connecting upper section 10b, and in continuation of inner connecting upper section 10a' an inner connecting lower section 10b', likewise in the form of a groove. Enclosure section 9 is similarly constructed. This makes it possible, when connector V3 is assembled, to tilt and assemble one of these enclosure sections, e.g. 9, at 180 degrees against the other enclosure section, e.g. 10, in such a manner that the groove-like connecting sections interlock, and in this fashion hold the enclosure sections together.

As is clear from FIGS. 6 and 7, each of the identically constructed enclosure sections 9 and 10 has on either side of the rectangular hollow space in the enclosure section a pair of guide lugs 22 for guiding the contact plate 11 in the center of the hollow space 23 (see also FIG. 5). Contact plate 11 also has a stop lug 24 on either side which, when contact plate 11 is inserted into one of the enclosure sections, e.g. 10, comes up against a stop 25. Two locking dogs 26 also lock their tapered ends into a locking opening 27 on contact plate 11. Each of the enclosure sections 9 and 10 has a pair of these locking dogs 26 turned in towards each other. At the final assembly stage, as indicated by FIGS. 5 and 6, locking dogs 26 lock into corresponding locking openings 27, and both enclosure sections are axially fixed together (see FIG. 6) by form-close interlocking and locking of the locking dogs 26. Additionally, contact plate 11 is locked by means of locking shoulders 28 behind locking cam 29.

As FIG. 7 shows, interface module V3 has two plug-in openings and two plug-in hollow spaces 30 and 31 for two coupler connectors, that are described later on. Each enclosure section, e.g. 10, has on each of the opposite facing sides of hollow spaces 30,31 a guide groove 32 located off-center in relation to the hollow-space axes. These guide grooves 32 come into mutual alignment when the two enclosure sections 9, 10 are tilted when being assembled. The guide grooves 32 operate in conjunction with other guides on the coupler connectors. In the different versions illustrated by FIGS. 7 to 10, the opposite facing sides of the plug-in hollow spaces 30, 31 have affixed to them coding elements or keying fins 33 in a different geometrical arrangement, which work in conjunction with corresponding coding elements or keying slots on the coupler connectors to ensure that the interface module plug-in receptacle and the corresponding coupler connector are noninterchangeably plugged together.

Figure 8:
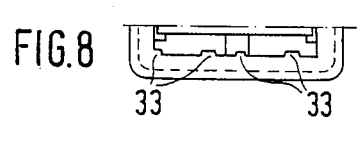
Figure 9:
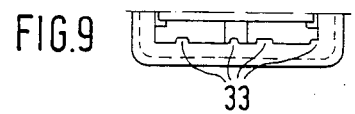
Figure 10:
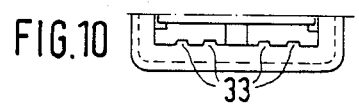

FIGS. 8 to 10 show, respectively, one half of the interface module.

Figure 14:
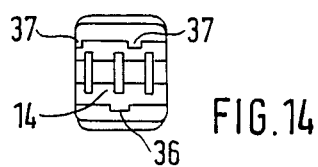
Figure 15:
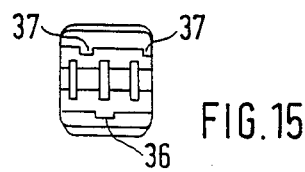
Figure 16:
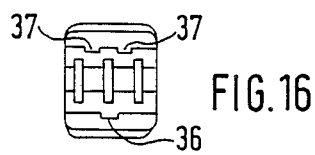

FIGS. 11 to 16, like FIGS. 5 to 10, illustrate the structure of a coupler connector, e.g. K1, and different keying versions of the same, in which the keying elements of the interface module in accordance with FIGS. 7 to 10 match the keying elements of coupler connector K1. As already mentioned, the coupler enclosure 13, made of insulating material, has a continuous slot 14 on the front. The fork-shaped ends of the contact terminals 15 are a spring length away from the inner surfaces of plug-in slot 14. The free ends of these contact terminals 15 have contact points 34. As shown in FIG. 14, in this embodiment there are three contact terminals 15 inserted in every coupler enclosure 13, separated from one another by a screen line distance of 2.5 mm. This screen line distance corresponds with the distances on the printed lines of contact plate 11 in the connector. At the other end, coupler enclosure 13 has a flange 35 for form-close connection with the extruded insulating sleeve 18. This insulating sleeve 18 encloses part of coupler enclosure 13, the soldering joint at 16, and part of connection lead 3, which is in this way firmly interconnected with coupler connector K1. In FIGS. 13 to 16, the reference number 36 represents guide fins, which act in conjunction with the interface module guide grooves. On the opposite side of coupler enclosure 13 there are keying slots 37 which act in conjunction with the interface module keying fins in the different keying versions.

Figure 17:
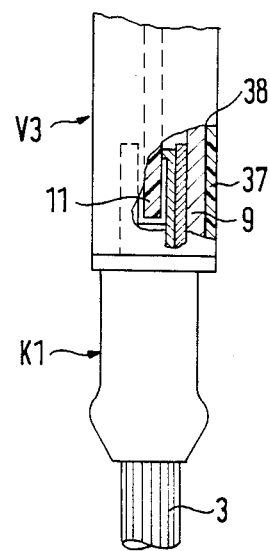
FIG. 17 represents a cable connector plugged into an interface module using a partial cross-sectional view in the link-up area.

FIG. 17 depicts a part of interface module V3 with a coupler connector K1 inserted into it. It can be seen that enclosure section 9 has an outside covering 37. This is produced by injection molding or is in the form of a shrink-on sleeve. Between covering 37 and the connection enclosure there is a piece of metal foil 38 serving as electrical screening or shielding material. Alternatively, the connection enclosure can be made of an electrically conducting plastic, with covering 37 serving as external screening. In the embodiment shown in FIG. 4, the electrical insulation should preferably be extended to cover the plug-in sleeves 21. Electrical contact with contact plate can also be made via the locking dogs 26, which would also be given an electrically conducting covering for this purpose.

FIG. 18 explains how the capacity of an interface module V3" can be expanded (in terms of the number of plug-in receptacles) through widening (dash-dotted lines) and/or the provision of several tiers 39, 40 (stacking) with several contact plates.

Figure 19:
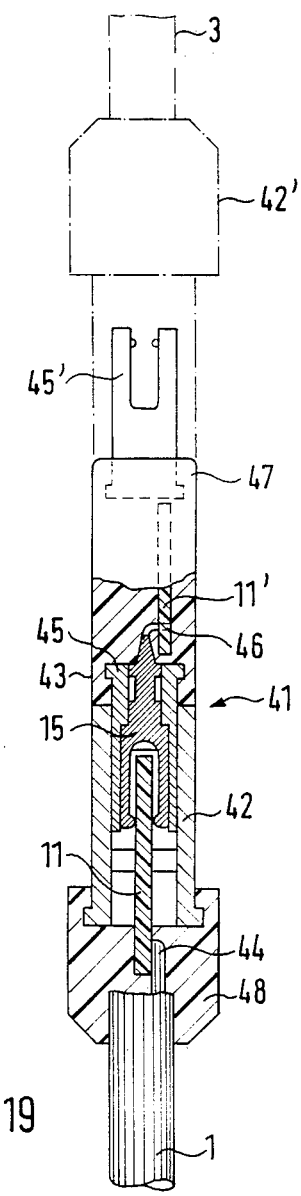
FIG. 19 is a partial cross-sectional view of an alternative version of connector and module.

In the embodiment illustrated in FIG. 19, a connection enclosure 41 is provided comprising two enclosure sections 42, 43 that can be assembled together. A contact plate 11 is fitted in enclosure section 42 that is connected to the soldered joint 44 by the wires of connection lead 1. The other enclosure section 43 can be mounted onto enclosure section 42. This section 43 is provided with an overlapping coupler section 45 containing contact terminals, thus creating a plug-in receptacle in the manner described. The contact terminals 15 are electroconductively connected by the printed lines of another contact plate 11', e.g. also by soldering, to soldering joints 46.

The reference number 47 indicates an insulation covering, an extrusion piece, for example, enveloping part of coupler enclosure 45, contact plate 11', and part of the additional coupling enclosure 45' affixed to the opposite side. Likewise, a part of coupling enclosure 42 is enveloped by an insulating covering 48, which secures connection lead 1. Contact plate 11' is electrically connected with the additional projecting coupler enclosure 45', on which again a plug-in receptacle unit in the form of enclosure section 42' (wherein a contact plate and a connection lead 3) can be mounted, as indicated by the dot-and-dash lines.

The universal system of cables and connectors can be readily understood from the table given below, wherein the designations used below correspond with those used for FIGS. 1 and 2.

| Combination of appliances | | Coupler connector | Interface module | Plug-in Receptacle |
|---|---|---|---|---|
| Zab | | K1/K2 | | B2/B1 |
| | with | | V3 | |
| Yef | | K1'/K2' | | A1/A2 |
| Zab | | K1/K2 | | B2/B1 |
| | with | | V3 | |
| Yef | | K1/K3 | | A1/A2 |
| Xcd | | K5/K3 | | B2/B1 |
| | with | | V6 | |
| Yef | | K1/K3 | | A1/A2 |

Figure 20:
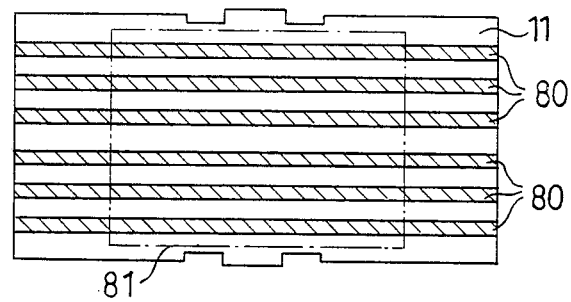
FIG. 20 illustrates a first type of contact plate construction.
Figure 21:
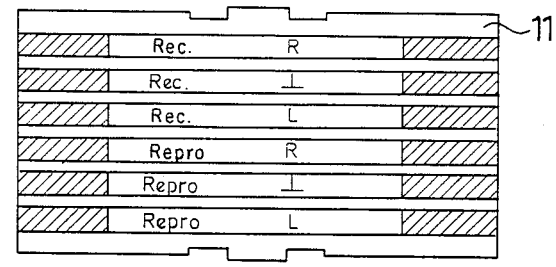
FIG. 21 illustrates representative contact plate designations.

FIGS. 20 and 21 show contact plate 11 with printed lines 80, and illustrate one layout version of an identification panel 81. Three lines for reception and three other lines for transmission are provided for the coupler connector. On the left-hand side of the identification panel, abbreviations can be seen for reception features, e.g., for reception and recording, and for transmission features, e.g. for transmission and reproduction. The abbreviations for channel lines can be seen on the right-hand side of the identification panel, R=right-hand channel, ⊥=ground, L=left-hand channel. The ground line ⊥ should preferably be in the middle, in-between the two other lines.

Figure 22:
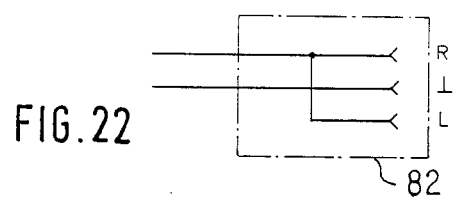
FIG. 22 illustrates the electrical wiring diagram for cable connectors with 2-terminal electrical connections.

FIG. 22 shows the wiring for coupler connector 82 with a two-pole plug-in connection. The necessary electrical connection from a stereo to a mono instrument is obtained by connecting the left-hand line L to the right-hand line R.

Figure 23:
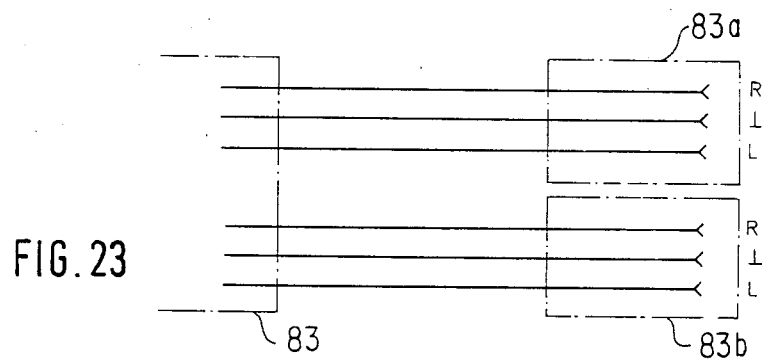
FIG. 23 represents the electrical wiring diagram of cable connectors with 5 or 6-terminal connections.

FIG. 23 shows the wiring for 5 or 6 pole plug-in connections 83. Here the contacts for reception are accommodated on coupler connector 83a, and those for transmission on coupler connector 83b. The preferred means of distinguishing between coupler connectors 83a and 83b is by color, since this is the general practice regarding coupler connectors. A number of coupler connectors that are in parallel can, either at the time of fabrication or subsequently through splicing, be combined to form one piece.

It is especially advantageous if at least one of the contact terminals in the coupler connectors, e.g. the middle one, and in particular the one for the ground, is made to project slightly, so that it is the first to make contact on the contact plate. This arrangement also ensures that sufficient power is distributed for coupling together.

Although the interface modules as described above can be used with the majority of audio and video applications, problems may arise if it is desired to establish a large number of effective electrical connections and it happens that no direct electrical connection is readily admissible. This can occur in particular where electronic data-processing is concerned. Especially for reasons of compatibility, not all electrical connections are admissible.

However, further development of the basic principle of the universal interconnecting system ensures that a suitable connection facility can be secured. An initial type of application is illustrated by FIG. 24.

Figure 24:
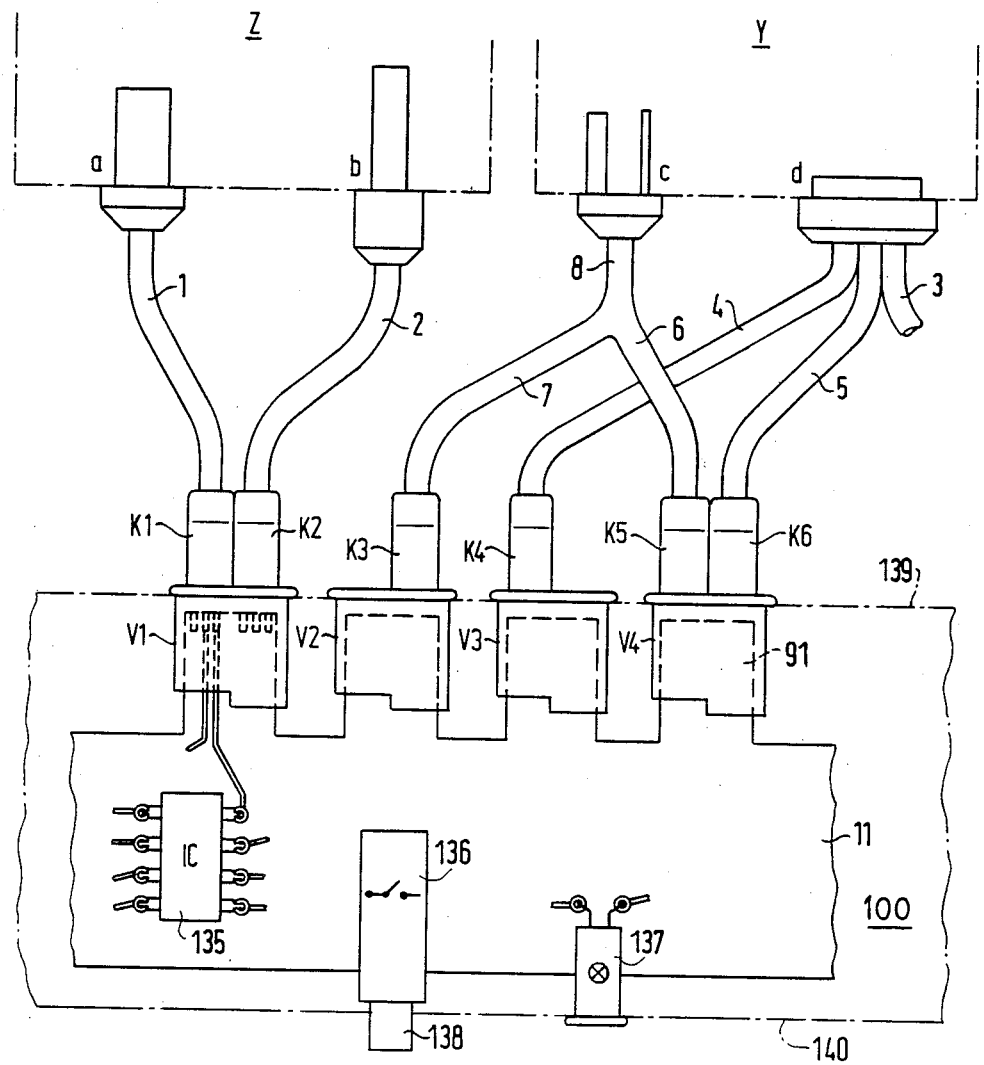
FIG. 24 illustrates the universal interconnection system in accordance with a further embodiment of the invention.

In accordance with FIG. 24, two electrical appliances, Y and Z, need to be electrically connected. The appliances are respectively equipped with connectors a, b and c, d. But direct linking of the two appliances, either by traditional methods or by the methods set out in FIGS. 1 and 2, is either inadmissible or not reasonably feasible. This is partly because the number of interconnections required for connectors c and d is very large, as is diagrammatically indicated for connectors c and d belonging to appliance Y. Furthermore, data-processing equipment is often provided with numerous connectors of the same type for which the connecting terminals are not fully documented, or for which different connections need to be made depending on the type of application.

For the embodiment illustrated in FIG. 24, in conformity with the invention, a circuit enclosure 100 is provided, with a contact plate 11 of somewhat larger dimensions on which a printed circuit and also electrical and/or electronic components can be accommodated. For example, FIG. 24 provides for an integrated circuit 135, an electrical switch 136, and an indicator light 137. The operating knob 138 of switch 136 faces forward, and can be operated from the outside. The visual side of the indicator light 137 also faces forward, as shown.

Additionally, the enclosure 100 has several interface module enclosure sections on the rear side, of which in the present embodiment the following interface module enclosure sections are shown: V1, V2, V3 and V4, each allocated to receive two coupling connectors. Further, various leads are provided with coupler connectors K1 to K6 at one end and corresponding plug-in connectors at the other end, for electrical contact with the connectors a, b, c, d of the electrical appliances to be interconnected.

The connection leads 1 and 2 correspond essentially with leads 1 and 2 as depicted in FIG. 1. Connection lead 3 is only partially indicated, and together with leads 4 and 5 is jointly connected to connector d of appliance Y. Each of the leads 4 and 5 has a corresponding coupler connector K4 or K6 at the other end. A multicore connection cable 8 is connected to connector c of appliance Y: this branches into cable sections 6 and 7, which carry at their ends coupler connectors K5 and K3 respectively. The terminals of the different coupler connectors K1 to K6 are connected with corresponding terminals belonging to the different interface module enclosure sections V1 to V4, whereby these terminals are accommodated on contact plate 11. As illustrated, not all the connection possibilities offered by the interface module enclosure sections are utilized. This demonstrates that different line occupancy and/or programming is possible. It also shows that, with careful selection of the number of interface module enclosure sections V and suitable construction of the printed circuit on contact plate 11, even appliances of a number of different makes can be interconnected with the use of only one circuit enclosure 100.

Furthermore, all the connections of an electrical appliance can be interconnected by means of appropriate leads to the printed circuit on contact plate 11 in circuit enclosure 100, so that, through an appropriately structured printed circuit and appropriate us of the electric switch 36, changes in the function of an electrical appliance can now be readily effected without the need, as before, to make tedious changes in the connections on the appliance itself. The circuit enclosure 100 accordingly accommodates a number of switches 136, and these in turn have a number of circuit elements that can be actuated by the operation of a single operating knob 138. This kind of switch is customary in the trade. In this way appliances from a variety of different manufacturers can all be linked together. Contact plate 11 accordingly accommodates interface circuits for two or more standard manufacturer's specifications as well as signal decoding circuits, so that appliances made by different manufacturers which are not usually mutually compatible, can be interconnected. Note that it is useful for the interface module enclosure sections V to be installed on one side, i.e., the rear side 139 of circuit enclosure 100, and that the operating and indicator elements, like operating knob 138 and indicator 137, are preferably fitted on the front side 140 of circuit enclosure 100. Identification, particularly in reference to the different interface module enclosure sections, based on system specifications, can at the same time be inscribed on the front side 140 and the rear side 139, to make it easier for the user to allocate the different coupler connectors K1 to K6 to individual interface module enclosure sections V1 to V4 and the terminals of contact plate 11.

FIG. 25, which will be discussed further below, shows the interconnection system of FIG. 24 in detail. The interface module enclosure sections V can take the form illustrated in FIGS. 7 to 10. This facilitates both warehousing and fabrication. However, this structure is not inevitably required.

FIGS. 26 through 28 illustrate embodiments using an enclosure section 10 in the circuit enclosure 100. Each enclosure section 10 has on either side of the rectangular hollow enclosure section a pair of guide lugs 22 for guidance of the respective section of contact plate 11 in the center of the hollow space 23 in enclosure section 10. For this purpose, the contact plate 11 is fitted in accordance with FIG. 24 with suitable tongue-shaped lugs, short tongues 91, that engage with it via guide lugs 22 of enclosure section 10. Contact plate 11 can for this purpose have a stop lug 24 at the tongue 91 that comes against a stop 25 when the contact plate 11 is inserted into enclosure section 10. Here again locking dogs 26 in enclosure section 10 lock into a locking opening 27 in tongue 91 on contact plate 11 via their projecting ends. Each of the enclosure sections V1 to V4 is allocated at least one of these locking dog/locking opening assemblies, as can be clearly seen in particular from FIG. 27, illustrating the final assembly stage. In addition, tongue 91 of contact plate 11 has locking shoulders 28 that lock behind locking cams 29 (FIG. 28).

As is shown by FIGS. 7 to 10 in conjunction with FIGS. 26 to 28, there are two coupler connectors K1 that can be inserted into an interface module enclosure section V. There are also two plug-in openings and plug-in hollow spaces 30 and 31 provided for coupler connectors K1, which is explained further later on.

Each enclosure section 10 has on the opposite facing sides of hollow spaces 30,31 a guide groove 32 located off-center in relation to the hollow space axes. These guide grooves 32 correspond basically with those illustrated in FIGS. 7 to 10 in relation to the enclosure sections, and operate in conjunction with the corresponding guide elements on the coupler connectors. In other embodiments, coding fins 33 can be in a different geometrical arrangement; these work in conjunction with corresponding coding elements or keying slots or the coupler connectors to ensure that the connector receptacle and the corresponding coupler connector are noninterchangeably plugged in together. The difference in geometrical arrangement can be in terms of height, width, shape and/or the number of coding fins used. Additionally, the geometrical arrangement can be such that several differently coded coupler elements in the manner of a superior and subordinate ordering can be inserted in a single hollow space or, conversely, a coupler element with a specific coding can be inserted in several differently coded hollow spaces.

As indicated in FIG. 27 the enclosure 10 can have locking cams 99 on the outside. The effect of this is that enclosure section 10 can be more securely affixed at the rear side 139. Enclosure section 10 is also inserted from outside circuit enclosure 100 in such a manner through a suitably dimensioned aperture 98 that the locking ca 99 becomes engaged behind the rear side 139. At the same time, the surrounding raised rim 20 at the rear remains outside or engages in a corresponding indentation 97 (FIG. 28).

FIG. 28 illustrates another version of the locking method for enclosure section 10 and contact plate 11 and their respective tongues 91. In this embodiment, a tongue-like projection 41 extends from enclosure section 10 with an appropriate locking dog 26a at the end, which engages in a corresponding locking opening 27a on tongue 91. But this version is also basically applicable to the connecting device of FIGS. 7 to 10, since the other enclosure section 10a can also be constructed in a similar way with a tongue-like lug 41a with locking dog 26, that engages in a locking opening 27 on tongue 91. The drawing shows that, here too, complete compatibility can be achieved. Indeed, several such lugs 41 or 41a can be positioned side-by-side. The tongue-like lug can also have a supporting piece 42 for tongue 91 of contact plate 11 between the joint with enclosure section 10 and locking dog 26a, which provides superior support. (With the use of a connector V as in FIGS. 7 to 10, a superior clamping effect is attained.)

FIG. 25 shows in diagram form the basic construction of a coupler connector K and its allocation to an interface module section V in circuit enclosure 100. The coupler connector K has a coupler enclosure 13 made of insulating material with a continuous slot at the front. The fork-shaped ends of the contact terminals 15 are a spring length away from the inner surfaces of the continuous slot 14. The free ends of these contact terminals 15 have contact points 34. At the other end, coupler enclosure 13 has a lug 16 that is soldered onto a conductor or shielding of cable 1. In this area coupler enclosure 13 belonging to coupler connector K is enveloped by an insulating sleeve 18, preferably produced by extrusion. This insulating sleeve 18 encloses a part of coupler enclosure 13 and in particular the soldered joint on lug 16. Coupler enclosure 13 has on its upwards-facing or downwards-facing surfaces the corresponding guide fins and grooves and/or keying or coding fins and slots of the kind previously described in relation to enclosure 10. As indicated, the guide grooves can be provided for coupler enclosure 13 and the corresponding guide fins for enclosure 10, and vice versa. The same applies to the coding fins and coding slots. Contact terminals 15 positioned side-by-side in coupler enclosure 13 should preferably be distanced from one another by the same screen line distance 2.5 mm as is normally applied with printed circuits.

In certain kinds of applications, it will not suffice to provide a single contact plate 11 in the circuit enclosure 100 if the variants that are worth the user's while to strive for are to be rendered feasible. Moreover, it is not always possible for all the variants sought after by users to be exploited merely through the provision of switches like those in FIG. 24. It is often necessary to provide at least one additional contact plate in the circuit enclosure 100 (see FIG. 31). In other instances it would prove useful to provide an additional programming and/or coding facility by installing supplementary equipment.

Figure 29:
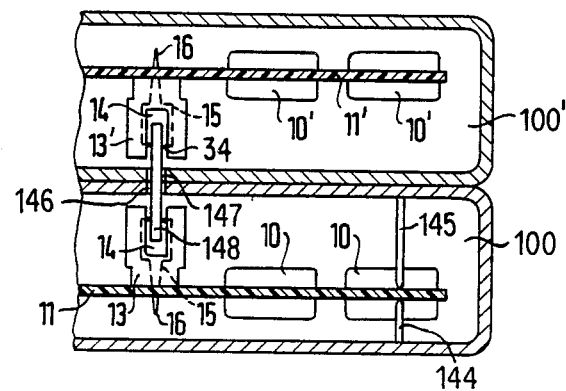
FIGS. 29 and 30 illustrate two further embodiments for connecting together two vertically stacked interface modules.

FIG. 29 depicts a version where the circuit enclosure 100 is supplemented by an additional circuit enclosure 100'. Both circuit enclosures 100 and 100' are basically of similar construction, comprising contact plates 11 and 11' to which the appropriate coupler connectors (not shown) can be connected via enclosure sections 10 and 10'. Supports 144 and 145 can additionally be fitted in the enclosures, as shown for circuit enclosure 100, as supports for contact plate 11.

Figure 30:
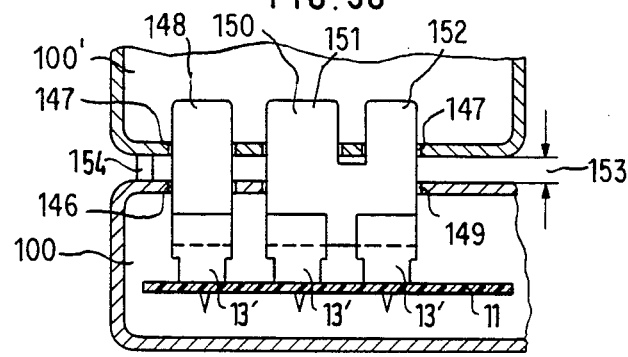

FIGS. 29 and 30 indicate slightly different forms of construction where enclosures 100 and 100' can be stacked vertically, so that they are placed on top of each other. Here it is necessary to establish an electrical connection, and if required, one that is codable, between the printed 20 circuits of contact plates 11 and 11' in the two enclosures 100 and 100'. For this purpose, coupler enclosures 13' can, as shown, be soldered at their free ends to the respective printed circuits of contact plate 11 and 11'. The respective plug-in slots are opposite each other through flush enclosure openings 146 and 147. Electrical contact is achieved with the aid of a contact plate 148 with printed conductors, that can be of the same design as contact plate 11 already described, in such a manner that electrical contact is established via the spring element of contact points 34 of contact terminals 15 in both coupler enclosures 13'. Through an appropriate arrangement of coupler enclosures 13' on contact plate 11 and coupler enclosures 13' on contact plate 11' in different supplementary circuit enclosures 100', an optional programming and/or coding facility can be provided with appropriate system allocation.

As shown in FIG. 30, several coupler enclosures 13' can be installed on contact plate 11, and a number of enclosure openings 146, 149 whereby contact plates 148, 150 of a different construction can be inserted. FIG. 30 illustrates an embodiment in which a contact plate 148 is allocated to a coupler enclosure 13', and projects through the opening 146 of the circuit enclosure 100. Besides this, an additional U-shaped shaped contact plate 150 is allocated to two coupler enclosures 13' positioned side-by-side, and projects outward from the circuit enclosure 100 through a suitably dimensioned enclosure opening 149. At the same time, in the embodiment represented here, the contact plate 150 has two tongues 151 and 152 on the side projecting outward. In this way, with connection being established with the circuit in circuit enclosure 100', in addition to the establishment of a programming and coding facility, greater protection is ensured against confusion and error. In the embodiment represented by FIG. 29, a coupler enclosure 13' is allocated to each contact plate 11 and 11'. It can however be useful to provide such a coupler enclosure 13' for contact plate 11 only, with the contact plate 148 or 150 to be inserted in this coupler enclosure 13 being firmly connected with the circuit on contact plate 11' belonging to the supplementary circuit enclosure 100'. By this method in particular, both coding and error protection can be safeguarded. It can also be worthwhile to provide for a gap 153 between the two vertically stacked circuit enclosures 100 and 100' as shown in the diagram of FIG. 30. Supplementary supports 154 can be provided to support them in the form of feet.

Figure 31:
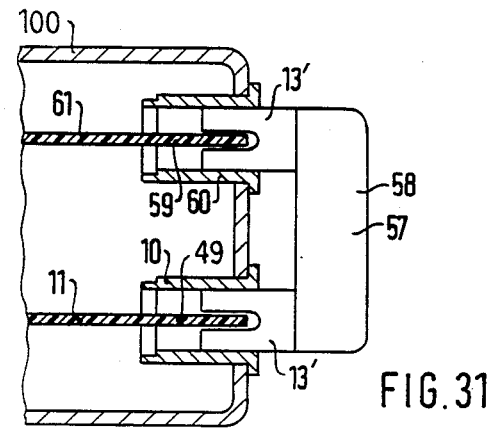
FIG. 31 illustrates a plug-in module for the interconnection of contact plates arranged one above the other.

As indicated in FIG. 31, a number of contact plates can be arranged in one enclosure 100 that are in electrical contact with one another. FIG. 31 shows contact plate 11 and an additional contact plate 61. Plate 61, in circuit enclosure 100, is shown in FIG. 31 to have tongues 59 as does contact plate 11, which, as is the case with enclosure 10, project in a corresponding enclosure section 60 that is for practical reasons of the same type of construction as enclosure section 10. The printed circuits of both contact plates 11 and 60 can be connected inside enclosure 100. External programming is however a feasible option with the aid of a plug-in module 58. Plug-in module 58 has at both ends coupler enclosures 13' constructed as already described, by means of which electrical contact can be established with the printed conductors on tongues 59 and 49 of the two contact plates 61 and 11. Direct electrical contact at least is achieved inside the plug-in module 58, principally in the rigid connector part 57, thus providing an optional coding facility. The connector part 57 can however also contain electrical and/or electronic components, offering basically the same facility options as those that have been explained to be available with the use of coupler connectors as described above, in terms of coding and control and the number of side-by-side contact terminals.

Use of a suitably dimensioned plug-in module 58 also enables the linking of contact plates 11 and 11' of two vertically stacked enclosures 100 and 100', as shown in FIG. 29, to be plugged into the corresponding enclosure sections 10 and 10'.

Figure 32:
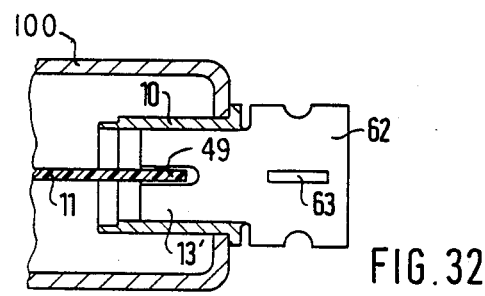
FIG. 32 represents a plug-in module for coding or programming with only one interface module.

As shown in FIG. 32, a riding facility can also be obtained with a configuration of a single contact plate 11 in a circuit enclosure 100 and a plug-in module 62; the latter, with an internal electrical circuit 63 as indicated in the diagram, has only one coupler enclosure 13', that is provided in an enclosure 10 to make contact with the printed conductors of the corresponding tongue 49 of contact plate 11. Here again, choice of the appropriate plug-in module 62 will provide a coding and/or programming facility, as for instance a termination with a specific resistance, a short-circuit, or other circuit components.

Figure 33:
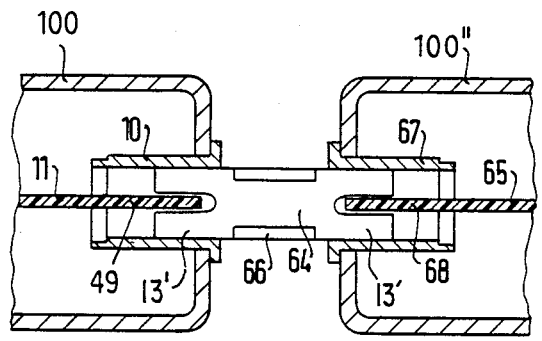
FIG. 33 represents a plug-in module for interconnecting horizontally stacked interface modules.

FIG. 33 demonstrates a further development in which horizontally stacked, i.e. side-by-side, circuit enclosures 100 and 100'' can be mutually linked by a plug-in module 64. This module 64 also has coupler enclosures 13' at the ends for making contact with the printed lines on contact plate 11 in circuit enclosure 100 and contact plate 65 in circuit enclosure 100''. The connector part 66 can, like the connector part 57 of the plug-in module 58 (see FIG. 31), contain not only circuits and/or printed conductors but also, if so required, supplementary electronic components for coding and/or programming. As made clear in FIG. 31, an enclosure section 67 is also provided in the circuit enclosure 100″ that incorporates a corresponding tongue 68 on contact plate 65 and into which a coupler enclosure 13′ can be plugged. Here also, guide grooves or coding slots can be provided, as already explained, for the prevention of confusion and errors.

Figure 34:
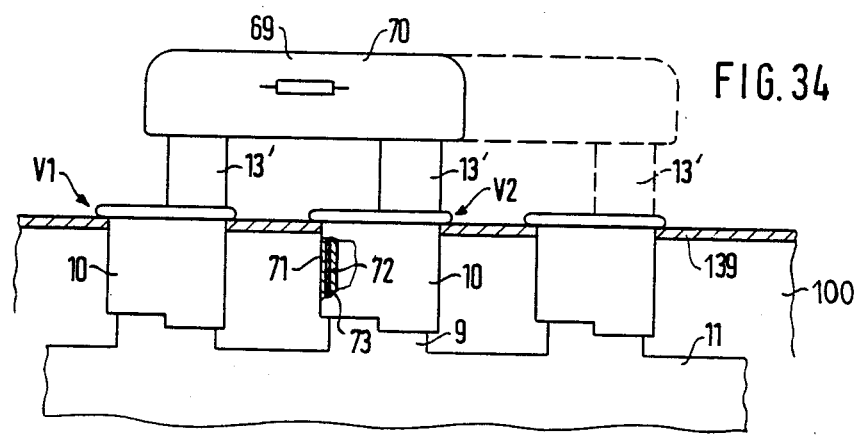
FIG. 34 represents a plug-in module for external programming or coding in reference to a circuit arranged on one contact plate.

Another from of construction is shown in FIG. 34. Here, with the use of a plug-in module 69 that can contain electrical components like resistances, ICs, or the like in the connector part 70, a coding and/or programming facility, for change of function, for example, can be provided via the circuit on contact plate 11 in circuit enclosure 100. In the embodiment in FIG. 34, two corresponding closure sections 10 are provided at the end, designed in such a way that, with the corresponding enclosure sections 10 in the plugged-in state, certain hollow spaces (see FIG. 7) will no longer be accessible. In this way faulty switching can be avoided after program selection. As indicated by the dashed lines, more that two such coupler enclosures 13′ can be provided for one plug-in module. Other practical applications of plug-in modules are feasible; as for instance any combinations of the plug-in modules 58, 62, 64 or 69 that have been described.

As indicated for one of the enclosure sections 10 in FIG. 34, the enclosure sections 10 can be provided with an external cover 71, and a piece of metal foil 73 can be provided between this cover 71 and the enclosure wall 72; this provides a metal shielding, as already explained earlier. It is at the same time expedient for the shielding 73 to be in electrical contact with contact plate 11 and the printed conductors on electrical tongue 91; this contact can be effected via the locking dogs 26, for instance, as explained earlier, if they are given an electroconductive coating or similar. Electrical shielding car also be afforded by means of an externally insulated electroconductive plastic.

Since it is common practice for shielded core leads to be used, it can be expedient to assign a contact terminal in each coupler connector for shielding, whereby corresponding contact with the shielding 73 is assigned to the appropriate printed conductor of contact plate tongue 91.

FIGS. 3 and 25 have in particular already demonstrated the basic construction of a coupler connector K. The insulating cover 18 also shows the use of facilitating cross-fins 74, 75. Furthermore, lettering and/or markings can be provided on the side surfaces 76; the lettering and/or markings can be positively or negatively applied during spraying with the use of an appropriate jet mold.

Figure 35:
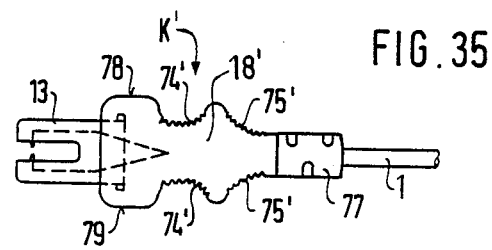
FIG. 35 illustrates a side view of a cable connector with a designation panel.
Figure 36:
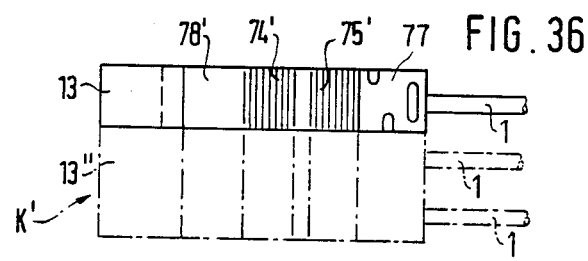
FIG. 36 provides a top view of the connector of FIG. 35.

FIGS. 35 and 36 show a version of a coupler connector K that can be compared with the above. Particularly so with FIG. 35, showing a version where, additionally, pull-relief 77 is provided for the cable 1 at the same time as the insulating cover is sprayed on. FIG. 35 also shows the provisions of additional panels 78, 79 for identification inscriptions that are also visible in the plugged-in state and with the side-by-side positioning of several similar coupler connectors. The inscriptions can be sprayed on in the same way, or can be done later.

FIG. 36 indicates that the coupler connector need not only have a coupler enclosure 13, as already explained, but that, as shown by the dashed lines, a wider coupler enclosure 13″ can be installed, with the overall width of coupler enclosure 13″ being purposefully many times greater than that of coupler enclosure 13. This form of construction allows a number of wires i to be joined firmly with a one-piece coupler connector K′. This also permits the provision of a larger inscribed panel 78′, whereby use of the coding and programming facilities, that have already been described, safeguards against confusion and incorrect interchanges. A pull-relief 77 can be provided for each wire i, as can grip grooves 74′ and 75′, in the manner previously described by FIG. 25.

To avoid confusion, in addition to the provision of coding grooves and slots, guide fins and guide grooves, and the identifications inscribed on panels 78, 79 and 78′, different colored plastic materials can be used for the coupler enclosure 13 and/or the insulation coverings 18.

From the foregoing, it ran now be seen that the present invention comprises a system that is of universal application for the interconnection of widely different electrical and electronic appliances. The interconnection system is so structured that, relying only on simple connection components, it can provide for any form of electrical linkage, even in the case of comparatively complicated equipment of widely different makes, such as data-processing equipment. The present invention is therefore eminently suitable for standardization, particularly as the keying and programming facilities it can offer are virtually unlimited, and interchanges that could damage the instruments concerned can undoubtedly be avoided. Moreover, the system of the present invention is suitable for systematizing all types of applications, so that the user can obtain the required electrical connections without any prior specialized knowledge. All in all, a complete and compatible bus system can be created that is not only suitable for commercial use but can be used professionally as well, and one that permits smooth and rapid changeovers whenever the user wishes.

I claim:

1. A universal interconnection system for coupling at least a first electronic apparatus to a second electronic apparatus, each of said first and second electronic apparatuses having at least a first and second connection terminal, said interconnection system comprising:
   first and second cables, each cable having at least a first and second conductor extending substantially therethrough;
   first and second connectors, each affixed to a first end of each of said cables, respectively, and having at least a first and second connection terminal connected to said first and second conductors, respectively, and matingly compatible with said first and second connection terminals of said first and second electronic apparatuses, respectively;
   third and fourth connectors, each affixed to a second end of each of said cables, respectively, and having at least a first and second connection terminal connected to said first and second conductors, respectively, and adapted to directly connect with the outer edge of a contact plate;
   an interconnect housing including a plurality of connectors matingly compatible with said third and fourth connectors, said housing connectors and said third and fourth connectors having keying means for restricting the manner in which they mate, said interconnect housing being solely supportable by said first and second cables when mated to said third and fourth connectors; and a plurality of interchangeable interconnect circuit means, each formed in the shape of a contact plate but each having different electrical circuit configurations, at least one being removably disposed within said interconnect housing, for coupling said first and second connection terminals of said third connector with those of said fourth connector in a plurality of different electrical circuit configurations, such that said connection terminals of each of said electronic apparatuses may be interconnected in various ways be removing and changing said interconnect circuit means.

2. The universal interconnection system of claim 1, wherein said interconnect circuit means are printed circuit boards.

3. The universal interconnection system of claim 1, wherein at least one of said interconnect circuit means includes electronic components as part of its electrical configuration.

4. The universal interconnection system of claim 1, wherein said interconnect housing is constructed and arranged as an in-line connector housing along a single axis of mating said third and fourth connectors to said housing connectors.

5. A universal interconnection cable for interconnecting two or more distinct electrical devices, each including at least one connector having at least two terminals, wherein said electrical device connectors may be of different connector types, said interconnection cable comprising:

two pair of wire leads;

two mating connectors, each mating connector connected to a first end of one of said two pair of leads, and each mating connector adapted to mate with one of said device connectors;

two coupler connectors, each couplet connector connected to a second end of one of said two pair of leads, each coupler connector having at least two terminals, and both of said two couplet connectors being of the type which are adapted to mate with the outer edge of a printed circuit board;

interface module means for mating with both of said two coupler connectors, said interface module means having an enclosure section; and contact plate means, having the shape of a printed circuit board and installed within said enclosure section, for mating with and for interconnecting said terminals of said two coupler connectors mated with said interface module means, said contact plate means having printed circuit means, on at least one surface thereof, for defining a particular electrical connection between said terminals of said two mated coupler connectors based upon the particular electrical circuit configuration of said contact plate means, whereby said terminals of said two mated coupler connectors may be interconnected in different ways by installing contact plate means having different electrical circuit configurations.

6. The interconnection cable of claim 5, wherein said contact plate means is a printed circuit board.

7. The interconnection cable of claim 5, wherein said contact plate means includes electronic components as part of its electrical circuit configuration.

8. The interconnection cable of claim 5, wherein said contact plate means are removably installed within said enclosure section in such a manner that said contact plate means are interchangeable.

9. The interconnection cable of claim 5, wherein said interface module means includes an in-line connector housing constructed and arranged such that said two coupler connectors are mated from opposite directions along a single axis of mating.

10. The interconnection cable of claim 5, wherein said interface module means is solely supportable by said two pair of leads when mated with said two coupler connectors.

11. The interconnection cable of claim 5, characterized in that said contact plate has at least one locking opening into which a locking dog on said enclosure section of said interface module means is locked.

12. The interconnection cable of claim 5, wherein the interface module means is comprised of two form-locking enclosure sections that can be assembled together, enveloped in a sleeve, at least in a region of separation, and in that each enclosure section has at least one locking dog and the contact plate has at least two locking openings which each receives one locking dog.

13. The interconnection cable of claim 5, characterized in that the interface module means is comprised of at least two enclosure sections that can be assembled together, and that a first enclosure section is equipped with a contact plate which is firmly connected to one of said wire leads, and is designed together with the contact plate as a receptacle, whilst a second enclosure section, that can be mounted on the first enclosure section, is equipped with a coupler connector connected to another one of said wire leads.

14. The interconnection cable of claim 13, characterized in that the second enclosure section is equipped with two coupler connectors and can be joined on either side with said enclosure sections incorporating contact plates.

15. The interconnection cable of claim 5, characterized in that said enclosure section of said interface module means is made of transparent plastic.

16. The interconnection cable of claim 5, characterized in that said enclosure section of said interface module means is provided with electrical shielding.

17. The interconnection cable of claim 16, characterized in that the enclosure section is wrapped in metal foil.

18. The interconnection cable of claim 5, characterized in that said enclosure section is provided with electrical shielding to which a contact plate is electrically connected via a locking dog on the enclosure section.

19. The interconnection cable of claim 5, characterized in that said enclosure section has plug-in sleeves projecting over a receptacle for at least one coupler connector.

20. The interconnection cable of claim 5, characterized in that said enclosure section is equipped with, extending in a plug-in direction of the connector, guide grooves, coding slots, guide fins, or coding fins which correspond to guide elements or with individual compatible coding elements on the coupler connectors.

21. The interconnection cable of claim 5, characterized in that a coupler connector has a coupler enclosure with a plug-in through slot at a front portion and incorporated at least one contact terminal forked to bear on opposite sides of the slot and which each have a contact point for securing contact with the printed circuit means.

22. The interconnection cable of claim 21, characterized in that the end of the coupler enclosure opposite the slot is inveloped in an insulation cover.

23. The interconnection cable of claim 5, characterized in that at least one of the two coupler connectors is differently colored.

24. The interconnection cable of claim 5, characterized in that said contact plate means carries an electrical circuit suitable for establishing correct electrical connection between electrical devices with a two pole connector and electrical devices with a three pole connector.

25. The interconnection cable of claim 5, characterized in that said interface module means is constructed in two adjacent sections and that the two adjacent sections are arranged separately from each other, each having its own receptacle, and each containing a contact plate, wherein the coupler connectors are connectable with the edge of each contact plate.

26. The interconnection cable of claim 25, characterized in that at least said two adjacent sections are arranged such that they share a single wall of the circuit enclosure.

27. The interconnection cable of claim 25, characterized in that with the horizontal stacking of a number of circuit enclosures having an opening through a shared wall, two contact plates can be electrically connected to one another via additional contact plates penetrating through the stacked enclosure openings.

28. The interconnection cable of claim 25, characterized in that for selectable external coding, external plug-in modules with at least one coupler connector are provided, which contain transfer circuit means and electrical components capable of altering the function of the circuitry on the contact plate in the circuit enclosure.

29. The interconnection cable of claim 25, characterized in that the interface module means is provided with electrical shielding.

30. The interconnection cable of claim 25, characterized in that the interface module means is provided with a number of contact plates arranged at one or more levels.

31. The interconnection cable of claim 5, characterized in that at least one of the coupler connectors has at least one inscribed identification panel.

32. The interconnection cable of claim 31, characterized in that the identification panel is visible in a plugged-in disposition in the interface module means.

33. The interconnection cable of claim 31, characterized in that the panel is visible where a number of coupler connectors are arranges side by side.

34. The interconnection cable of claim 31, characterized in that the panel bears an inscription which is at least partly positively or negatively sprayed on.

35. The interconnection cable of claim 5, characterized in that a coupler connector has a pull-relief for a cable.

36. The interconnection cable of claim 35, characterized in that the pull-relief is sprayed on.

37. The interconnection cable of claim 5, characterized in that said interface module means and said coupler connectors are given different colors corresponding to a mechanical coding system using coding fins and coding slots.

38. An in-line connector system for coupling at least a first cable to a second cable, each of said first and second cables having at least a first and second conductor extending substantially therethrough, said connector system comprising:

first and second coupler connectors, each affixed to a first end of each of said cables, respectively, and having at least a first and second connection terminal connected to said first and second conductors, respectively, and wherein each of said coupler connectors is adapted to mate with the outer edge of a printed circuit board;

an interconnect housing including a plurality of receptacles matingly compatible with said first and second coupler connectors along a single axis of mating, said housing receptacles and said coupler connectors having keying means for restricting the manner in which they mate, said interconnect housing being solely supportable by said first and second cables when mated with said coupler connectors; and a plurality of interchangeable printed circuit board means, each having different electrical circuit configurations, at least one being removably and entirely disposed within said interconnect housing and directly connected along opposing outer edges of said printed circuit board to said first and second connection terminals of both said first and second coupler connectors, for providing on-line interconnection between said terminals of said first and second coupler connectors when mated with said interconnect housing, and for defining a plurality of different electrical circuit configurations of said terminals of said first and second coupler connectors based upon the particular electrical circuit configurations of said plurality of printed circuit boards.

39. The connector system of claim 38, characterized in that there is at least one printed circuit board means carrying electronic components.

40. The connector system of claim 38, characterized in that the printed circuit board means carries inscriptions.

41. The connector system of claim 38, characterized in that the interconnect housing is made of electrically conductive plastic covered with an insulating layer.

42. The connector system of claim 38, characterized in that at least one coupler connector is inscribed with lettering.

43. The connector system of claim 38, characterized in that said interconnect housing is separable into two sections, each section having its own receptacle defining a circuit enclosure section for said printed circuit board means, wherein the coupler connectors are connectable with opposite edges of said printed circuit board means.

44. The connector system of claim 38, characterized in that for selectable external coding, external plug-in modules with at least one coupler connector are provided which contain transfer circuits and electronic components capable of altering the function of the circuit configuration of the printed circuit board means.

45. The connector system of claim 38, wherein the interconnect housing includes a tongue-like lug extending obliquely from the rear and includes a dog at an end which extends into a locking opening in the printed circuit board means, wherein the tongue-like lug has a supporting piece for supporting the printed circuit board means.

46. The connector system of claim 38, wherein the printed circuit board means includes a stop log protruding outwardly and the interconnect housing includes a stop in a path of the stop lug.

47. The connector system of claim 38, wherein the printed circuit board means has at least one shoulder protruding from a side and wherein said interconnect housing has a locking cam protruding from a side wall, wherein insertion of the shoulder into the interconnect housing beyond the locking cam snaps the shoulder of the support into a secure position.

* * * * *